(12) United States Patent
Mazer (10) Patent No.: US 10,391,565 B2
(45) Date of Patent: Aug. 27, 2019

(54) HOLE SAW GUIDE

(71) Applicant: Alain Gary Mazer, Vista, CA (US)

(72) Inventor: Alain Gary Mazer, Vista, CA (US)

( * ) Notice: Subject to any disclaimer, the term of this patent is extended or adjusted under 35 U.S.C. 154(b) by 0 days.

(21) Appl. No.: 15/873,741

(22) Filed: Jan. 17, 2018

(65) Prior Publication Data

US 2018/0236567 A1  Aug. 23, 2018

Related U.S. Application Data

(60) Provisional application No. 62/460,529, filed on Feb. 17, 2017.

(51) Int. Cl.
| | |
|---|---|
| *B23B 35/00* | (2006.01) |
| *B23B 49/02* | (2006.01) |
| *B23B 49/00* | (2006.01) |
| *B23B 51/04* | (2006.01) |

(52) U.S. Cl.
CPC .............. *B23B 49/00* (2013.01); *B23B 49/02* (2013.01); *B23B 51/0406* (2013.01); *B23B 35/00* (2013.01); *B23B 51/0426* (2013.01); *B23B 2260/072* (2013.01); *B23B 2260/104* (2013.01); *B23B 2270/34* (2013.01)

(58) Field of Classification Search
CPC ......... B23B 49/00; B23B 49/02; B23B 49/04; B23B 51/0426; B23B 51/0406; B23B 2251/428; B23B 2251/46; B23B 2260/072; B23B 2260/104; B23B 2270/34; B23B 45/003; B23B 35/00
See application file for complete search history.

(56) References Cited

U.S. PATENT DOCUMENTS

| | | | | |
|---|---|---|---|---|
| 1,448,697 A | * | 3/1923 | Misener | B23B 51/0426 408/206 |
| 3,097,891 A | * | 7/1963 | Brideau | B23B 49/02 173/31 |
| 3,775,020 A | * | 11/1973 | Stoutenberg | B23B 49/02 408/115 R |
| 3,851,990 A | * | 12/1974 | West | B23B 49/026 408/1 R |
| 4,579,486 A | | 4/1986 | Damico | |

(Continued)

FOREIGN PATENT DOCUMENTS

| | | | | |
|---|---|---|---|---|
| BE | 1009362 A6 | * | 2/1997 | ......... B23Q 11/0053 |
| DE | 2535112 A1 | * | 2/1977 | ......... B23B 51/0426 |

(Continued)

*Primary Examiner* — Ryan C Rufo
(74) *Attorney, Agent, or Firm* — Stetina Brunda Garred & Brucker (57) ABSTRACT

A general purpose hole saw guide and a method of forming holes through surfaces, without the need of a centering bit, are provided. The hole saw guide includes a circular disk with concentric grooves on its surface. The disk is transparent and portable for placement on a surface through which a hole is to be drilled to facilitate the centering and stabilizing control of a hole saw on the surface. The method includes the steps of providing a transparent disk having concentric grooves; positioning the disk on a surface; mounting the disk to the surface; inserting a hole saw that is fitted to a drill into the grooves of the disk; drilling a hole through the disk and surface beneath it; and removing the disk from the surface after the hole has been drilled.

6 Claims, 11 Drawing Sheets

(56) References Cited

U.S. PATENT DOCUMENTS

| | | | |
|---|---|---|---|
| 4,749,315 A | 6/1988 | Mills | |
| 4,968,189 A | 11/1990 | Pidgeon | |
| 5,087,158 A * | 2/1992 | Devine | B23B 49/026 |
| | | | 408/241 B |
| 5,366,326 A | 11/1994 | Converse | |
| 5,743,682 A | 4/1998 | Chaney, Sr. | |
| 5,820,315 A | 10/1998 | Collard | |
| 5,871,310 A | 2/1999 | Mortensen | |
| 6,048,141 A | 4/2000 | Freeman | |
| 6,305,885 B1 | 10/2001 | Linthicum | |
| 6,409,437 B1 | 6/2002 | Metzger | |
| 6,676,343 B2 | 1/2004 | Burk | |
| D499,002 S | 11/2004 | Troxell | |
| 6,881,017 B1 | 4/2005 | Krecek et al. | |
| 7,513,718 B1 | 4/2009 | Arnold | |
| 8,443,523 B2 | 5/2013 | Lam et al. | |
| 8,696,268 B2 | 4/2014 | Bell et al. | |
| D723,897 S | 3/2015 | Lenyo et al. | |
| 9,925,600 B2 | 3/2018 | Hsu et al. | |
| 9,969,010 B2 | 5/2018 | Chartier et al. | |
| 2009/0172911 A1 * | 7/2009 | Miyanaga | B23B 49/02 |
| | | | 15/339 |
| 2013/0209187 A1 * | 8/2013 | Bell | B23B 51/0426 |
| | | | 408/115 R |
| 2015/0336183 A1 * | 11/2015 | Karl | B23B 51/0054 |
| | | | 408/1 BD |

FOREIGN PATENT DOCUMENTS

| | | | | |
|---|---|---|---|---|
| DE | 4114703 A1 | * | 11/1992 | B23B 49/02 |
| DE | 19835689 A1 | * | 2/2000 | B23B 51/0406 |
| EP | 1327493 A1 | * | 7/2003 | B23B 49/02 |
| GB | 216309 A | * | 5/1924 | B23B 51/0426 |
| GB | 639315 A | * | 6/1950 | B23B 51/0426 |
| JP | 59147617 A | * | 8/1984 | |
| JP | 2007283464 A | * | 11/2007 | |
| WO | WO-2016049667 A1 | * | 4/2016 | B23B 49/02 |

\* cited by examiner

HOLE SAW GUIDE

CROSS-REFERENCE TO RELATED APPLICATIONS

This application relates to and claims the benefit of U.S. Provisional Application No. 62/460,529, filed Feb. 17, 2017 and entitled "HOLE SAW GUIDE," the entire disclosure of which is hereby wholly incorporated by reference.

STATEMENT RE: FEDERALLY SPONSORED RESEARCH/DEVELOPMENT

Not Applicable

DESCRIPTION OF THE INVENTION

The present invention relates to general construction tools. In particular, the present invention relates to a hole saw guide for facilitating the drilling of a circular opening through surfaces where prior holes may or may not exist and where a pilot bit (also known as a centering bit) may or may not be used.

A hole saw is commonly used to cut large holes through surfaces. Complete hole saw assemblies are typically comprised of a hole saw blade, which is a cylinder with cutting blades or abrasive material on an open side of the cylinder, the blades or abrasive material of which are parallel to the surface of the cylinder on one end and a hole on its other end through with an arbor is secured. The arbor secured to the hole saw blade typically retains a long pilot drill bit on the one end and on the other end possesses a shaft that fits into a drill. The protruding pilot bit of the complete hole saw assembly, being centered within the diameter of the hole saw and opposite the drill, is placed on a surface, perpendicular to the surface, at the center of the location where a hole is desired. Upon activation of the drill to which the hole saw assembly is attached, the turning pilot bit of the hole saw assembly pierces the surface and, as it progresses into the surface, allows the turning hole saw trailing behind it to draw closer to the surface.

The hole saw blade, having made contact with the surface, begins to cut a circular hole in the surface around its diameter, stabilized in its rotation by the pilot bit that serves as the axis of the hole saw assembly, and cut surface material is accumulated within the hole saw blade space between its walls and the pilot bit. When the hole saw has cut the hole through the surface and through to the other side of the surface, the material contained within the hole saw assembly is rendered wholly separate from the substrate, and the drill and attached hole saw assembly are backed-out of the hole in the substrate.

The existing hole saw assembly presents significant shortcomings in common situations, however. First, if a hole already exists in the substrate at the desired location of a larger hole, then there is no surface on which to position the pilot bit of the hole saw assembly. As such, absent the pilot bit providing an axis around which the hole saw rotates, it is practically impossible to position the hole saw at the desired location or contain the hole saw at its desired position when the hole saw is rotating. Furthermore, absent a pilot bit providing an axis for the hole saw, it is not possible to pierce the surface of the substrate to stabilize the hole saw at the desired location and from kickback or sliding of the hole saw blade. Such misalignment or kickback may result in a damaged surface and misshapen hole. At worst, an entire surface may be destroyed and the operator of the drill fitted with the hole saw may be injured. In addition to problems arising from a lack of pilot bit, it is oftentimes impossible for an existing pilot bit to drill into a substrate if the pilot bit is not constructed with a shape and materials composition that is able to penetrate the substrate material.

In the past, some have attempted to solve some of the inaccuracy problems in hole saw drilling through the use of templates that allows the drilling of pilot holes in a surface. Such templates are not generally disposed to a plurality of applications or hole saw dimensions. Such a template is shown in U.S. Pat. No. 4,280,776. While the devices disclosed therein may provide a limited solution for hole saw drilling, the tool is insufficient for general hole saw use.

BRIEF SUMMARY OF THE INVENTION

In order to address one or more of the shortcomings discussed above, a hole saw guide is provided herein. In the present embodiment of the invention, a transparent disk with concentric grooves on its surface is provided. The disk is configured for positioning on a surface to facilitate the forming of an opening in the surface.

In the present embodiment of the invention, a method is provided for forming an opening in a surface. The method comprises the steps of providing a surface; providing a hole saw guide comprising a transparent disk with concentric grooves; mounting the disk at a desired position on said surface for forming a hole; inserting a hole saw of desired diameter within said concentric groove, said groove corresponding to the desired diameter of opening; said hole saw guide mounted to a drill and forming said opening by said hole saw when drill is activated.

A hole saw guide may comprise a transparent disk, said disk having on its surface a series of concentric grooves, said disk being destructible, said disk being able to be mounted by a plurality of means to a flat surface.

A hole saw guide system may comprise a surface through which a circular opening is to be made; a transparent disk having concentric grooves on its surface, said grooves defining a plurality of possible hole areas, said grooves able to contain and stabilize hole saws of corresponding diameters; wherein said disk is destructible, said disk being able to be mounted by a plurality of means to surface; wherein said disk material may be removed from the surface after hole through said surface is drilled by said hole saw.

A method of forming a hole in a surface may comprise providing a surface through which a circular opening is to be made; providing a hole saw guide comprising a transparent disk, said disk having on its surface concentric grooves; determining a desired position on said surface for forming a circular opening of desired diameter; based on said desired position, wherein said hole saw guide is aligned with said desired position and actually mounted by one or another means to said surface; and hole saw guide is mounted to said surface so that said concentric groove of desired radius on the hole saw guide is aligned with said position where an opening through the surface is desired; and inserting a hole saw of desired diameter within said groove of corresponding diameter; with said hole saw mounted to a drill and forming said hole when placed in the hole saw guide and when drill is activated.

BRIEF DESCRIPTION OF SEVERAL VIEWS OF THE DRAWINGS

The present embodiment of the invention are illustrated in the accompanying drawings wherein.

DETAILED DESCRIPTION OF THE PREFERRED EMBODIMENTS

Figure 1:
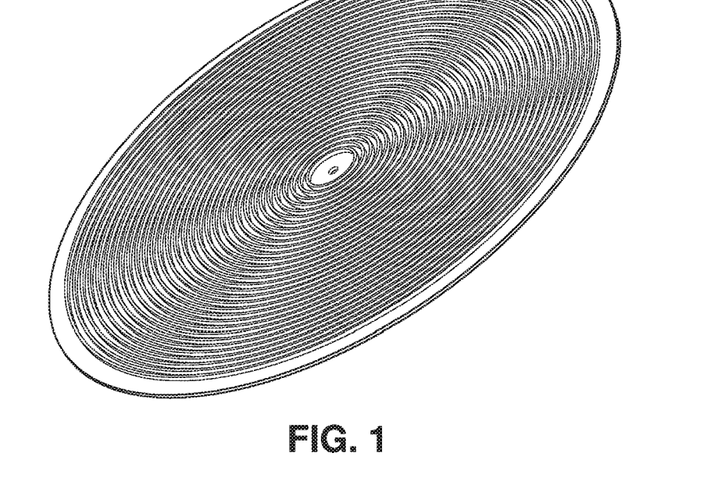
FIG. 1 is a perspective view of a first embodiment of the hole saw guide, showing the top portion thereof, in accordance with the present invention.
Figure 2:
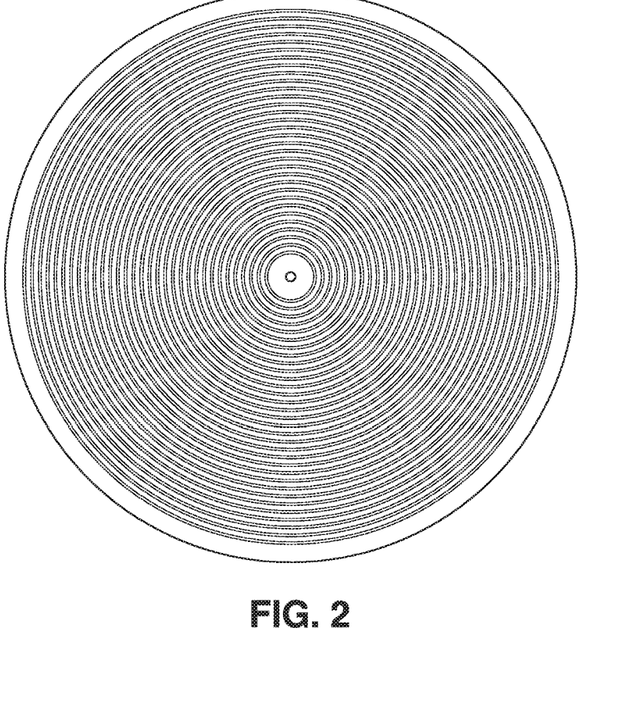
FIG. 2 is a top elevational view of FIG. 1.
Figure 3:
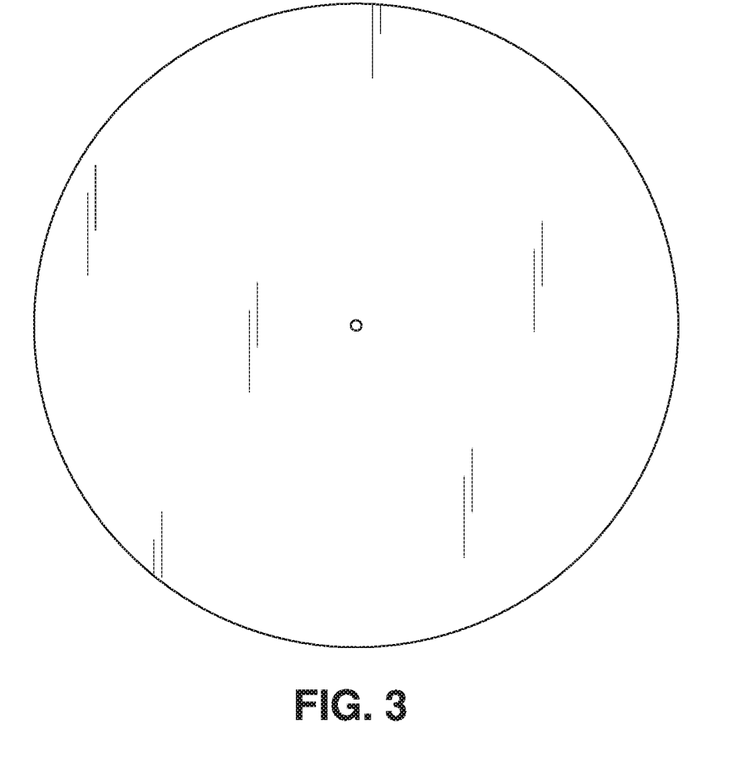
FIG. 3 is a bottom elevational view of FIG. 1.
Figure 4:
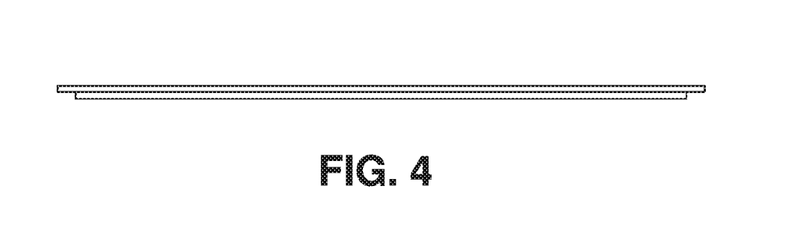
FIG. 4 is a side view of FIG. 1.
Figure 5:
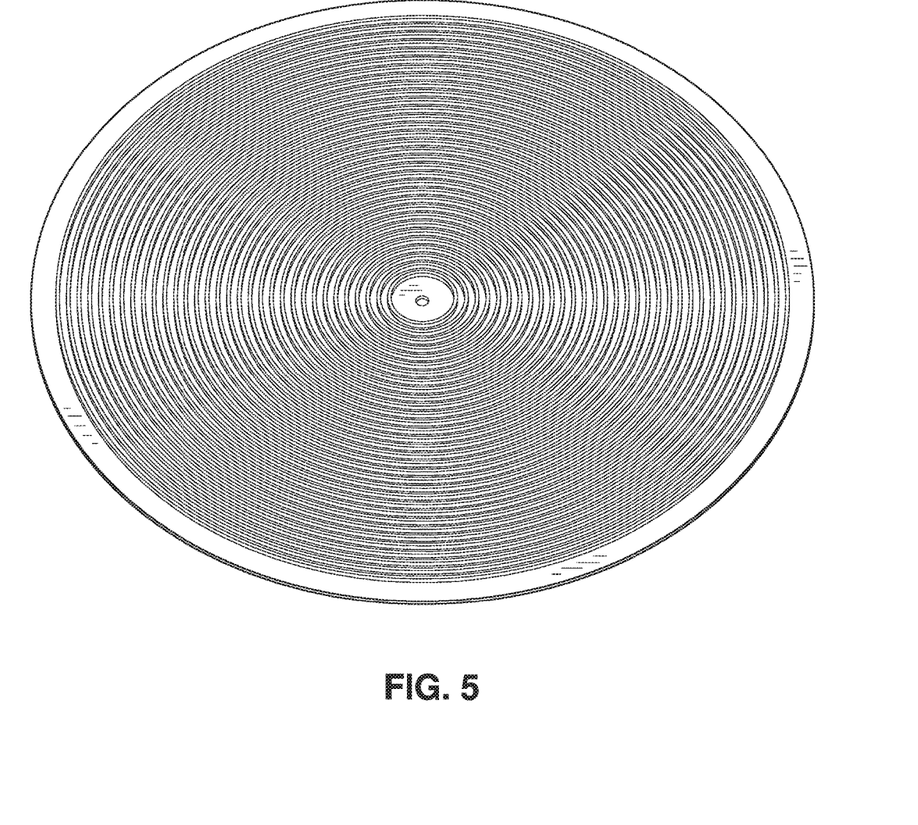
FIG. 5 is a view of the hole saw guide from the top toward the bottom.
Figure 6:
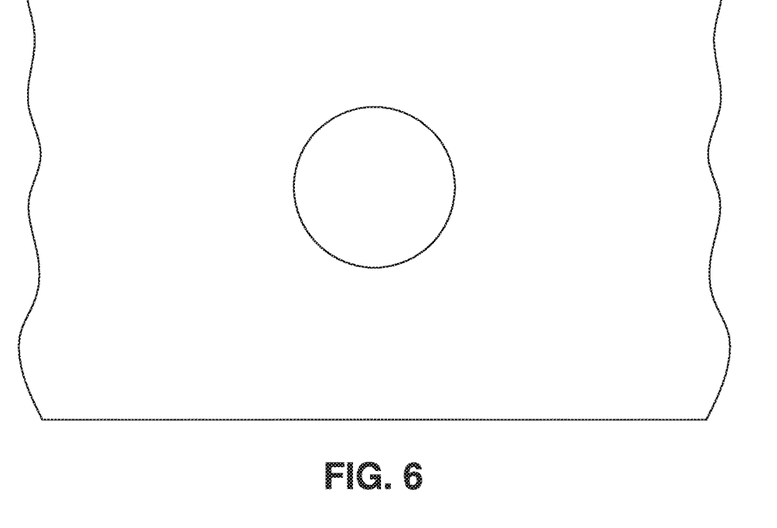
FIG. 6 is a view of a reference marking at a desired hole location.
Figure 7:
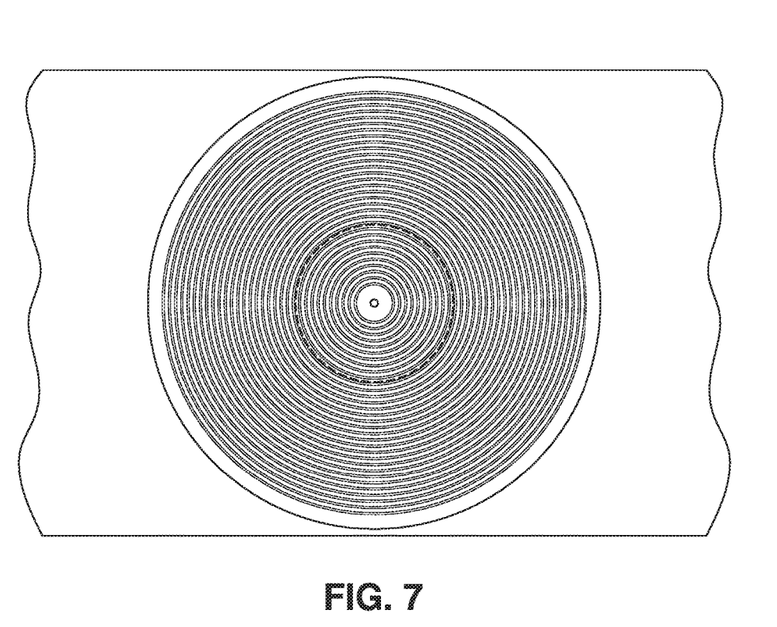
FIG. 7 is a view from above with the hole saw guide positioned over the desired hole location, centered by aligning the reference marking with a corresponding groove on the hole saw guide.
Figure 8:
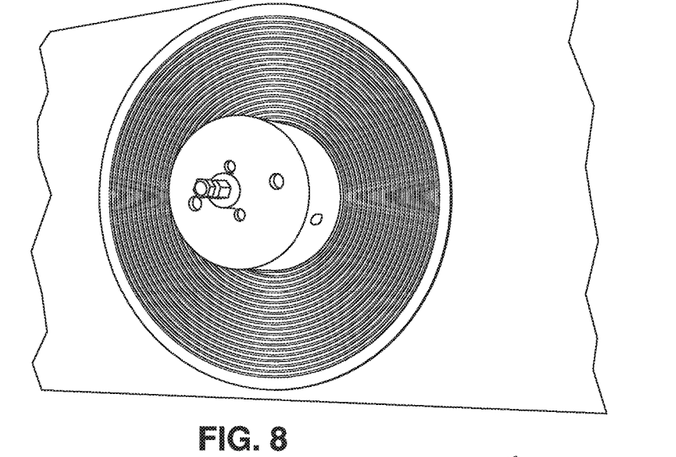
FIG. 8 is a view from above, with a hole saw (without pilot bit) of desired diameter placed in a groove on the hole saw guide which corresponds to the desired hole position.
Figure 9:
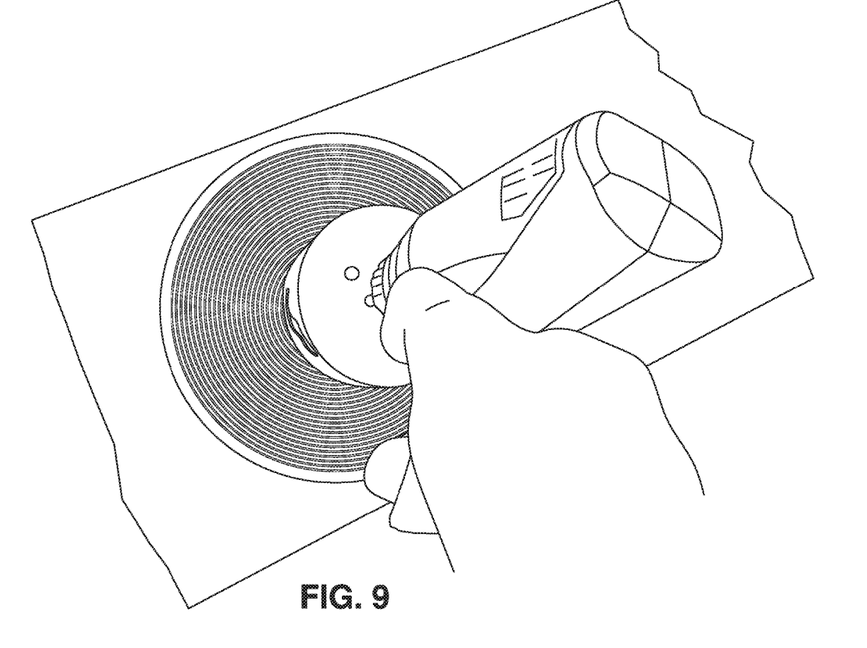
FIG. 9 is a view from above, with a drill attached to the hole saw of desired diameter placed in the groove on the hole saw guide which corresponds to the desired hole position.
Figure 10:
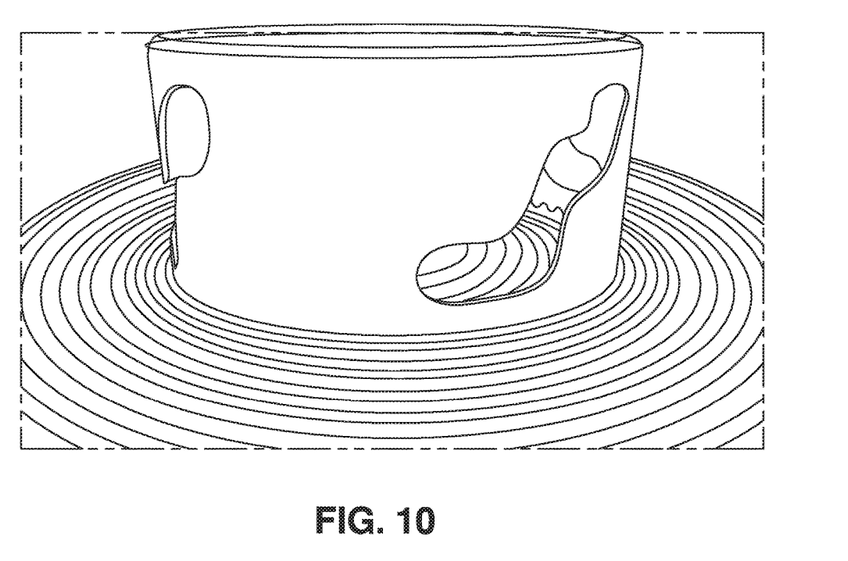
FIG. 10 is a close-up view from the side of the hole saw of desired diameter placed in the groove on the hole saw which corresponds to the desired hole position.
Figure 11:
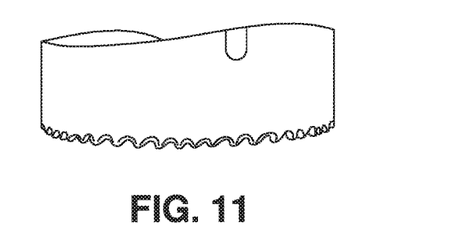
FIG. 11 is a view from the side, below the surface, of the drill attached to the hole saw passing through the surface, having passed through the hole saw guide.
Figure 12:
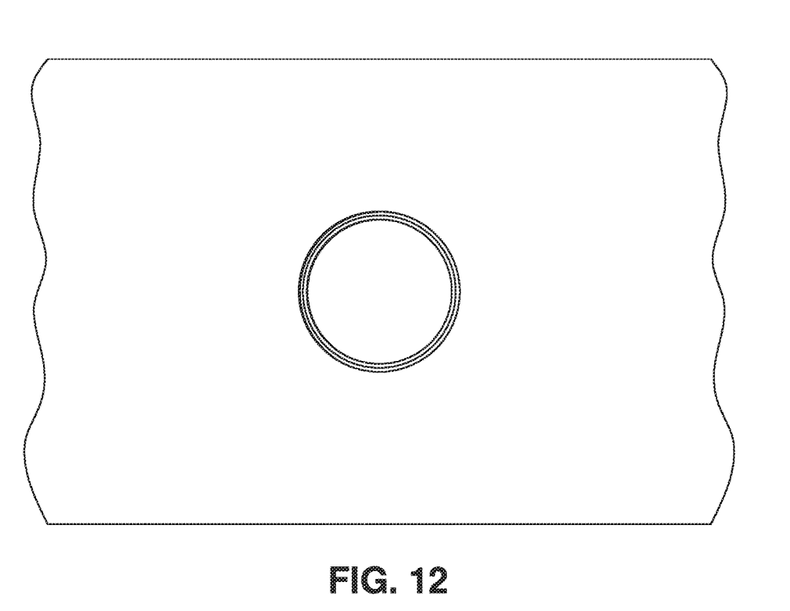
FIG. 12 is a view from above of the surface with an opening of the desired diameter, after using the hole saw guide and related method.
Figure 13:
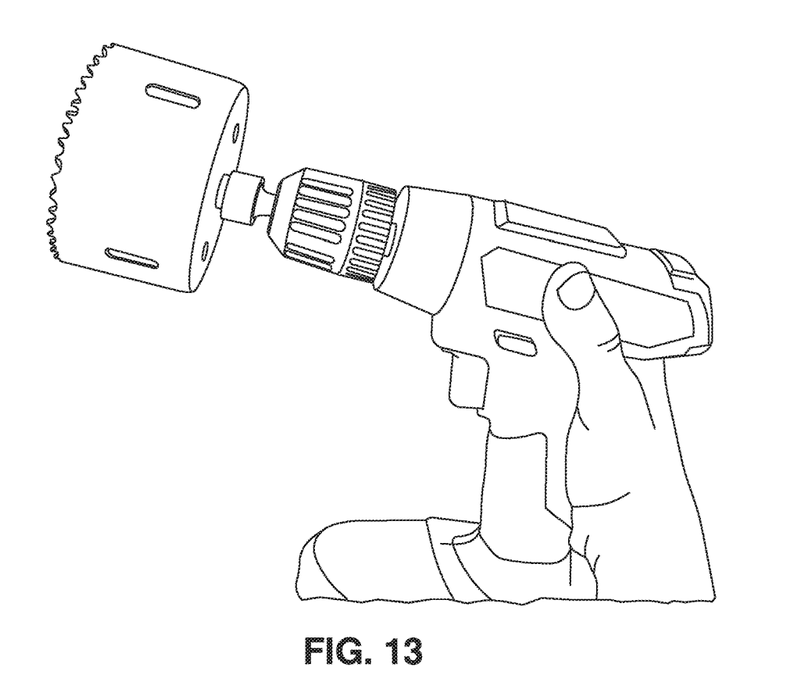
FIG. 13 is a view of a typical drill and hole saw configuration (with exception of pilot bit).
Figure 14:
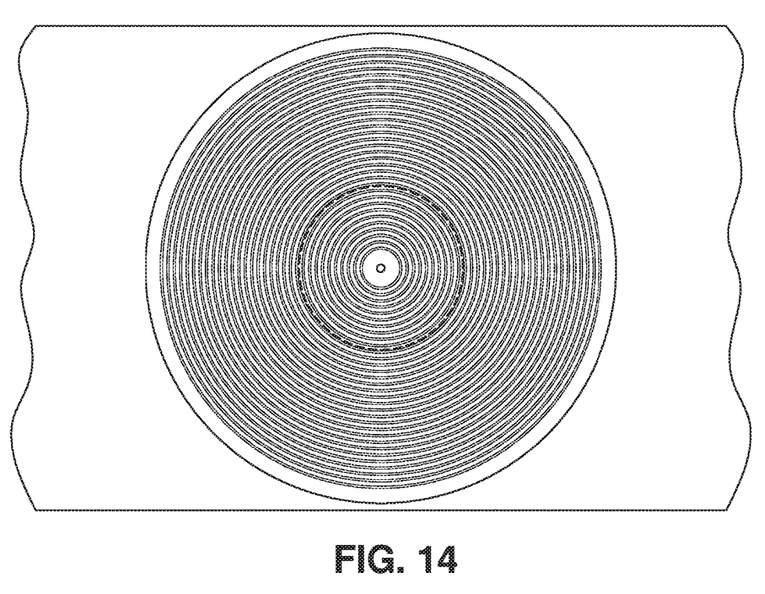
FIG. 14 is a view from above of the hole saw guide centered over an existing opening, and where a larger diameter hole is desired.
Figure 15:
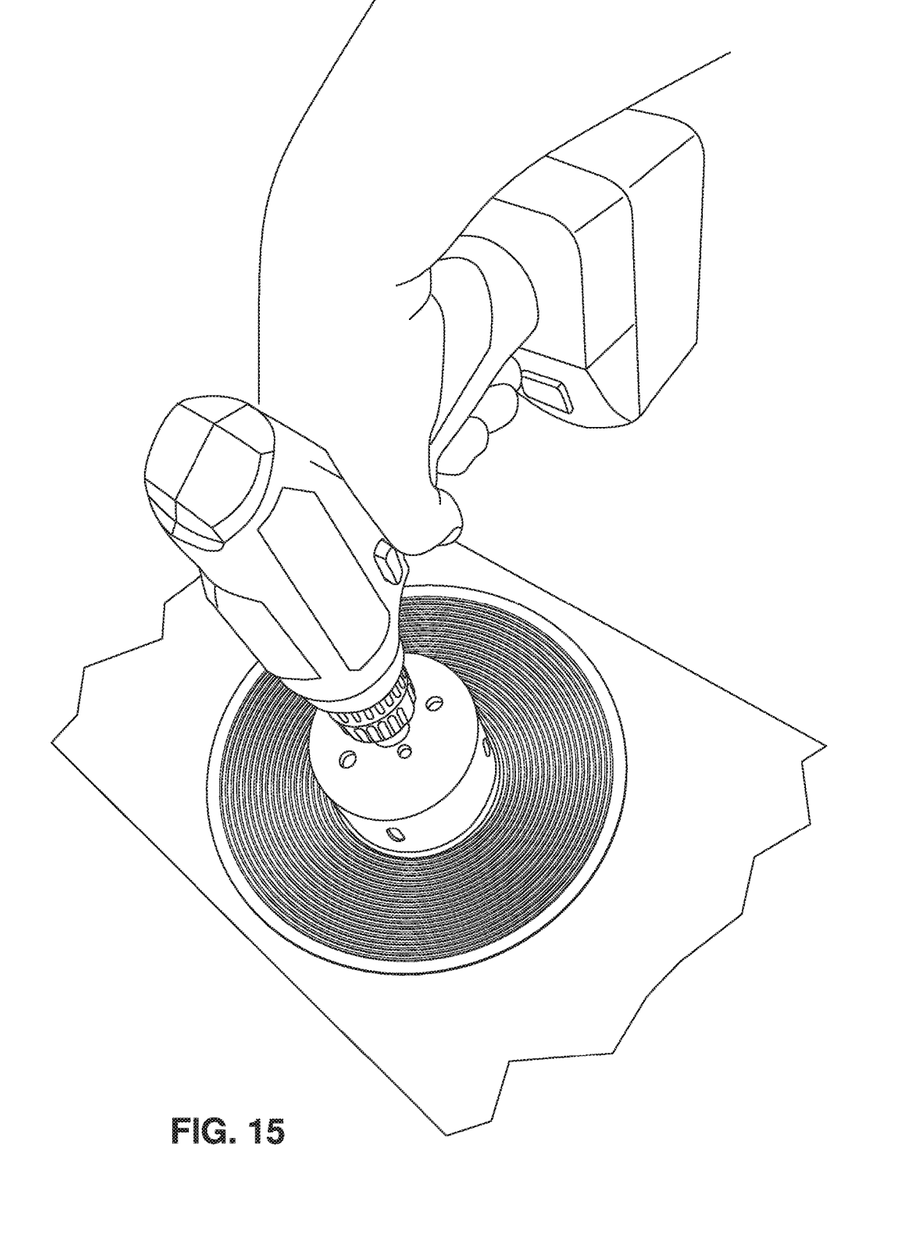
FIG. 15 is a view from above of the drill attached to the hole saw of desired diameter placed in the groove on the hole saw guide which corresponds to the desired hole position, the desired hole diameter being larger than a pre-existing opening in the surface.
Figure 16:
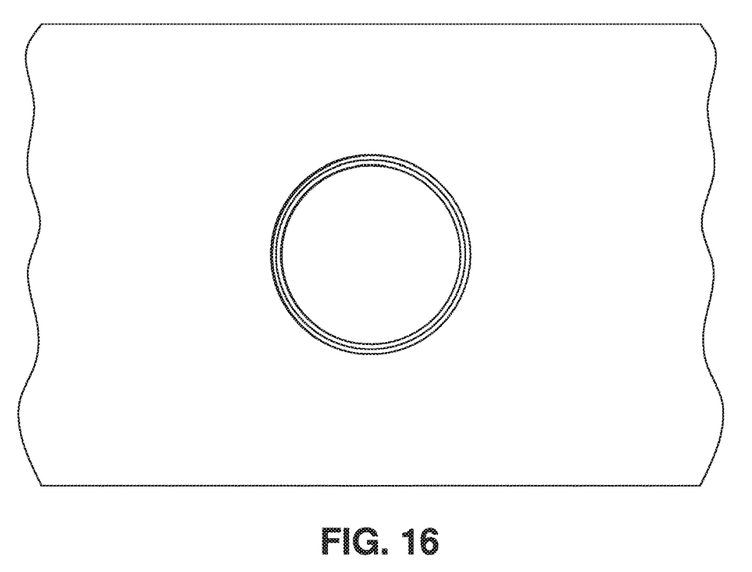
FIG. 16 is a view from above of the surface with the opening of desired diameter, after using the hole saw guide and related method.
Figure 17:
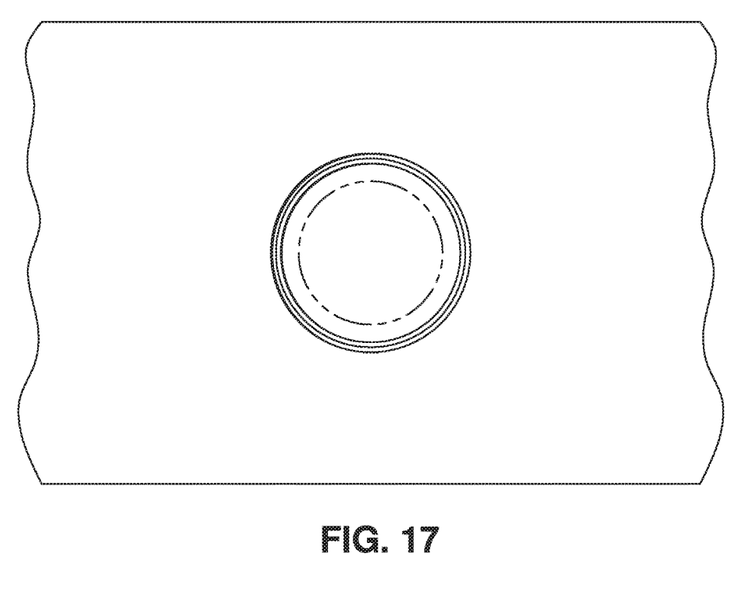
FIG. 17 is a view from above, for purposes of reference, of the surface with the opening of larger desired diameter, after using the hole saw guide and related method, with surface material from a previously made hole of smaller diameter that constituted the pre-existing opening in the surface.
Figure 18:
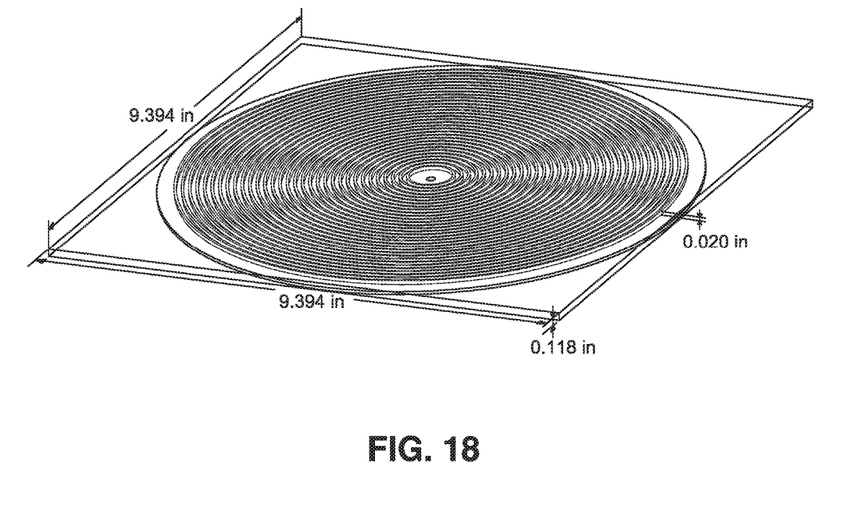
FIG. 18 is a view of a rendering of the hole saw guide to illustrate dimensions according to an embodiment of the hole saw guide. Actual production dimensions may vary slightly.

The present embodiment of the invention is shown in FIG, having been constructed from solid SLA material through a Computer Numeric Control (CNC) process. The invention may likewise be made with injection molding process, additive processes ("3D printing") or other methods that are common to the production of plastic goods.

What is claimed is:

1. A method of forming a hole in a work surface, said method comprising:
   providing a hole saw guide comprising: a transparent disk, said disk having on its surface concentric circular grooves;
   determining a desired position on said work surface for forming a circular opening of a desired diameter;
   aligning said hole saw guide with said desired position so that one of said concentric circular grooves of the hole saw guide having a corresponding diameter to that of said desired diameter for the circular opening is aligned with said desired position;
   inserting a hole saw having a corresponding diameter to the one of said concentric circular grooves of the hole saw guide within the one of said concentric circular grooves of the hole saw guide;
   cutting through the hole saw guide with the hole saw, within the one of said concentric circular grooves of the hole saw guide, prior to cutting into the work surface; and
   forming said circular opening using said hole saw with said hole saw mounted to a drill and the drill being activated.

2. The method of claim 1, further comprising mounting said hole saw guide to said work surface at said desired position.

3. The method of claim 1, further comprising mounting said hole saw to the drill while the hole saw is inserted within the one of said concentric circular grooves of the hole saw guide.

4. The method of claim 1, wherein said aligning includes aligning the one of said concentric circular grooves of the hole saw guide with a reference marking on said work surface.

5. The method of claim 1, wherein said aligning includes aligning the one of said concentric circular grooves of the hole saw guide with an existing opening in said work surface.

6. The method of claim 5, wherein a pilot drill bit is not used in conjunction with said hole saw.

* * * * *